United States Patent
Shen et al.

(10) Patent No.: US 10,428,641 B2
(45) Date of Patent: Oct. 1, 2019

(54) DRAW-DOWN PRESSURE APPARATUS, SYSTEMS, AND METHODS

(71) Applicant: Landmark Graphics Corporation, Houston, TX (US)

(72) Inventors: Xinpu Shen, Houston, TX (US); Guoyang Shen, Houston, TX (US); William Standifird, Fulshear, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

(21) Appl. No.: 15/026,815

(22) PCT Filed: Apr. 17, 2015

(86) PCT No.: PCT/US2015/026423
§ 371 (c)(1),
(2) Date: Apr. 1, 2016

(87) PCT Pub. No.: WO2016/167799
PCT Pub. Date: Oct. 20, 2016

(65) Prior Publication Data
US 2017/0342821 A1    Nov. 30, 2017

(51) Int. Cl.
*E21B 47/06* (2012.01)
*G06F 9/455* (2018.01)
(Continued)

(52) U.S. Cl.
CPC .............. *E21B 47/06* (2013.01); *E21B 43/00* (2013.01); *G01V 99/00* (2013.01); *G06F 9/455* (2013.01); *E21B 43/117* (2013.01)

(58) Field of Classification Search
CPC ........ E21B 47/06; E21B 43/117; G01V 99/00; G06F 9/455
(Continued)

(56) References Cited

U.S. PATENT DOCUMENTS 4,101,172 A * 7/1978 Rabbitts .................. E21B 43/24
166/271
6,581,685 B2   6/2003 Burgess et al.
(Continued)

FOREIGN PATENT DOCUMENTS

WO    WO-2014153084 A2    9/2014

OTHER PUBLICATIONS

"International Application Serial No. PCT/US2015/026423, International Search Report dated Jan. 7, 2016", 3 pgs.
(Continued)

*Primary Examiner* — Yoshihisa Ishizuka

(57) ABSTRACT

In some embodiments, an apparatus and a system, as well as a method and article of manufacture, may operate to determine a value of strain, such as an equivalent plastic strain, in a perforated portion of a well by applying a set of draw-down pressures to the surface of at least one perforation tunnel in the perforated portion. The perforated portion, in turn, is modeled using stress components provided by a global field model that includes the location of the well, to set boundary conditions at the surface of the well. A well drilling process and a tunnel perforating process are modeled with element removal and pressure addition for the perforated portion. Additional activity may include operating a controlled device based on the value of strain that is determined. Additional apparatus, systems, and methods are disclosed.

20 Claims, 10 Drawing Sheets

(51) Int. Cl.
G01V 99/00 (2009.01)
E21B 43/00 (2006.01)
E21B 43/117 (2006.01)

(58) Field of Classification Search
USPC .......................................................... 702/11
See application file for complete search history.

(56) References Cited

U.S. PATENT DOCUMENTS

| | | | |
|---|---|---|---|
| 8,066,072 B2 | 11/2011 | Lumbye | |
| 8,714,252 B2 | 5/2014 | Glenn et al. | |
| 2004/0112597 A1* | 6/2004 | Hamid | E21B 33/1208 166/250.17 |
| 2005/0121197 A1 | 6/2005 | Lopez de Cardenas et al. | |
| 2008/0033704 A1* | 2/2008 | Sayers | E21B 7/04 703/10 |
| 2009/0055098 A1* | 2/2009 | Mese | E21B 43/00 702/13 |
| 2010/0088076 A1* | 4/2010 | Koutsabeloulis | E21B 43/00 703/2 |
| 2011/0061860 A1* | 3/2011 | Dean | E21B 43/00 166/250.01 |
| 2012/0158388 A1 | 6/2012 | Rodgers et al. | |
| 2014/0214325 A1* | 7/2014 | Wessling | E21B 47/06 702/11 |

OTHER PUBLICATIONS

"International Application Serial No. PCT/US2015/026423, Written Opinion dated Jan. 7, 2016", 4 pgs.

Republic of France Institute National Property Industry, French Preliminary Search Report, FR1651792, dated Jan. 31, 2018, 8 pages, France.

Xinpu Shen, Case Studies on 3-Dimentional Numerical Prediction of Critical Pressure Drawdown for Wells in Weak Formations, American Rock Mechanics Association, Jun. 26-29, 2011, 8 pages, ARMA 11-177, 45$^{th}$ US Rock Mechanics/Geomechanics Symposium, San Francisco, California.

Euripides Papamichos and Eva M. Malmanger, A Sand-Erosion Model for Volumetric Sand Predictions in a North Sea Reservoir, SPE 69841, Feb. 2001, 7 pages, Society of Petroleum Engineers, Reservoir Evaluation & Engineering.

P.J. Van Den Hoek, G.M.M. Hertough, A.P. Kooijman, PH. De Bree, C.J. Kenter, and E. Papamichos, A New Concept of Sand Production Prediction: Theory and Laboratory Experiments, SPE 36418, Oct. 6-9, 1996, 15 pages, SPE Annual Technical Conference and Exhibition, Denver, Colorado United States.

Yarlong Wang, and Baoping Lu, A Coupled Reservoir-Geomechanics Model and Applications to Wellbore Stability and Sand Prediction, SPE 69718, Mar. 12-14, 2001, 14 pages, SPE International Thermal Operations and Heavy Oil Symposium, Margarita, Venezuela.

X. Yi., P.P. Valko, and J.E. Russell, Predicting Critical drawdown for the Onset of San Production, SPE 86555, Feb. 18-20, 2004, 12 pages, SPE International Symposium and Exhibition on Formation Damage Control, Lafayette, Louisiana, United States.

Gbenga Folorunso Oluyemi and M. Babs Oyeneyin, Analytical critical drawdown (CDD) failure model for real time sanding potential prediction based on Hoek and Brown failure criterion, Journal of Petroleum and Gas Engineering, Apr. 14, 2010, 10 pages, vol. 1(2), http:/www.academichouranls.org/JPGE © 2010 Academic Journals.

Abaqus Analysis User's Manual, 2008, 699 pages, vol. 3, Material, Version 6.8, Velizy-Villacoublay, France: Dassault Systems.

Xinpu Shen, Case Studies, on 3-Dimentional Numerical Prediction of Critical Pressure Drawdown for Wells in Weak Formations, ARMA 11-177, Jun. 26-29, 2011, 8 pages, The 45$^{th}$ US Rock Mechanics/Geomechanics Symposium, San Francisco, California.

Kim A.S. and Sharma M.M., A Predictive Model for Sand Production in Realistic Downhole Condition, ARMA 12-314, Jun. 24-27, 2012, 7 pages, The 46$^{th}$ US Rock Mechanics/Geomechanics, Symposium, Chicago, Illinois United States.

E. Pacheco, M.Y. Soliman, R. Zepeda, and J. Wang, Sanding Prediction in a Gas Well Offshore Mexico Using a Numerical Simulator, SPE 122962, May 31-Jun. 3, 2009, 14 pages, SPE Latin American and Caribbean Petroleum Engineering Conference, Cartagena, Colombia.

M. Bai, C. Santana, and X. Shen, A comprehensive approach in predicting excessive sand production, Oct. 21-23, 2011, 7 pages, Beijing, China.

J. Wang, R.G. Wan, A. Settari, and D. Walters, Prediction of Volumetric Sand Production and Wellbore Stability Analysis of a Well at Different Completion Schemes, ARMA/USRMS 05-842, Jun. 25-29, 2005, 12 pages, The 40$^{th}$ U.S. Symposium of Rock Mechanics, (USRMS): Rock Mechanics for Energy Mineral and Infrastructure Development, North Region Anchorage, Alaska.

J. Zhang, W.B. Standifird, and X. Shen, Optimized Perforation Tunnel Geometry, Density and Orientation to Control Sand Production, SPE 107785, May 30-Jun. 1, 2007, 7 pages, European Formation Damage Conference, Sheveningen, The Netherlands.

G. Volonte, F. Scarfato, and M. Brignoli, Sand Prediction: A Practical Finite-Element 3D Approach for Real Field Applications, SPE 134464, Sep. 19-22, 2010, 24 pages, SPE Annual Technical Conference and Exhibition, Florence, Italy.

* cited by examiner

| PP/MPs | PDD/MPs | Peeq(%) | CRITICAL VALUE OF PLASTIC STRAIN(%) |
|---|---|---|---|
| 42 | 0 | 0 | |
| 41 | 1 | 2.412 | |
| 40 | 2 | 2.788 | |
| 39 | 3 | 3.212 | |
| 38 | 4 | 3.692 | 3 |
| 37 | 5 | 4.242 | |
| 36 | 6 | 4.852 | |
| 35 | 7 | 5.512 | |
| 34 | 8 | 6.192 | |

RESERVOIR, TVD LOCATION OF PERFORATION

DRAW-DOWN PRESSURE APPARATUS, SYSTEMS, AND METHODS

PRIORITY APPLICATION

This application is a U.S. National Stage Filing under 35 U.S.C. 371 from International Application No. PCT/US2015/026423, filed 17 Apr. 2015; which application is incorporated herein by reference in its entirety.

BACKGROUND

Understanding the structure and properties of geological formations can reduce the cost of drilling wells for oil and gas exploration. Measurements made in a borehole (i.e., downhole measurements) are typically performed to attain this understanding, to identify the composition and distribution of material that surrounds the measurement device downhole.

As an example, sand production can affect the ability to efficiently recover hydrocarbons. This phenomenon, sometimes known to those of ordinary skill in the art as "sanding", can reduce or prevent oil flow within a sand reservoir, and disturb the proper functioning of oil field production equipment.

DETAILED DESCRIPTION

Introduction to the Solution

Figure 1:
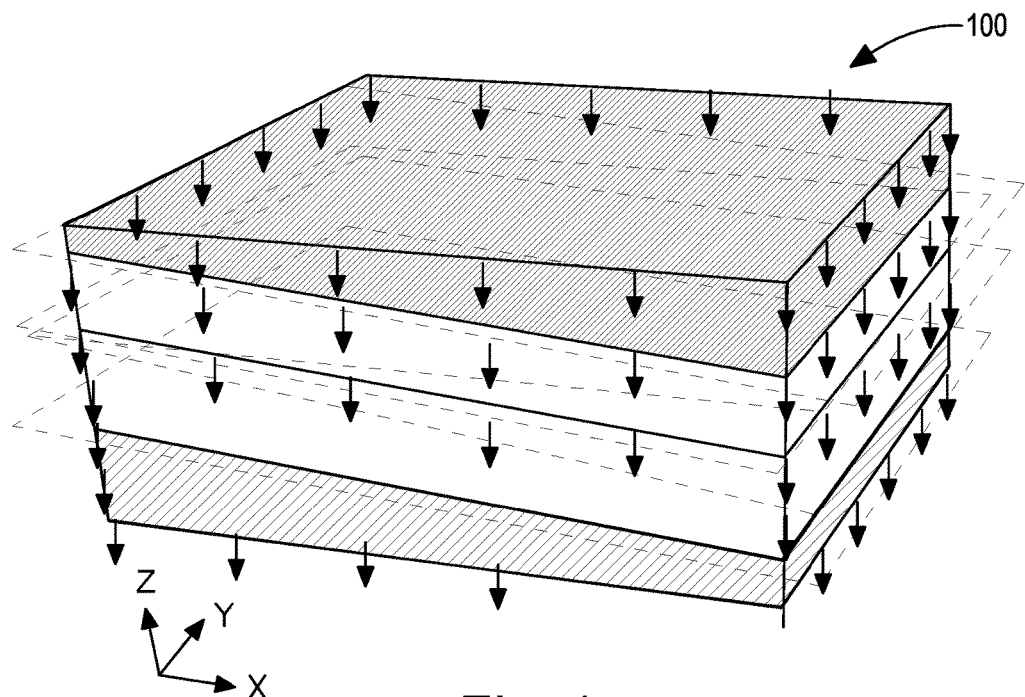
FIG. 1 illustrates building a three-dimensional (3D) global model of a field, according to various embodiments.

In general, sand production occurs when the stresses within the formation exceed the strength of the formation. Thus, sand production can be caused by material instability in poorly cemented and unconsolidated sand formations.

When considered as a kind of material instability within the formation, plasticity may play a significant part in the process of sand production. The term "strain" as used herein may refer to plastic strain, and more specifically, to equivalent plastic strain. Thus, strain, along with Von Mises stress, can be used to describe the result of forces applied to materials, and will be used to describe the properties of formation materials in the following paragraphs.

A few researchers have attempted to use numerical calculation to predict sanding and erosion for weak formations. However, these existing methods for predicting what is known in the art as a critical value for pressure draw-down (CVPDD), which is related to the onset of sanding, fail to capture the dual-stress concentration phenomena that are present around the well and the perforation tunnels. That is, two areas of stress concentration overlap each other at the region where the perforation tunnel intersects the well, and as a result, the accuracy of CVPDD values obtained using current methods is low. Moreover, the strain in the formation caused by the process of forming a perforation tunnel is not distinguished from the strain in the formation caused by pressure drawdown. Consequently, conclusions based on the calculated strain values are inaccurate.

According to the literature arid engineering observation, the CVPDD depends on formation strength properties; formation pore pressure; a geostress tensor, including both mean stress and stress deviator; grain size; formation thickness and other geometrical parameters; and other factors. In addition, the CVPDD depends on the form of completion, such as open-hole completion, or casing completion.

The risk of sand production depends on the amount of equivalent plastic strain at each material point. If plastic strain occurs over a large area around borehole for open-hole completion and around a perforation tunnel for a cased hole, then the sanding potential is high. For a cased hole, due to the complexity of stress distribution, the calculation of sanding prediction may be accomplished with a 3D finite element method, as will be illustrated using a numerical solution for geostress in the validation example of the next section.

In order to better understand the plastic strain generated in a well with perforation tunnels, it is useful to discuss details of the perforating process. A perforation tunnel is created by shooting a perforation gun in a well that contains fluid. The process of forming the perforation tunnel is somewhat complicated, being a dynamic process: as the perforation gun fires a set of perforation bullets, each bullet perforates the casing to create a perforation tunnel in the formation. The tunnel ends when the speed of the perforation bullet is reduced to zero. Due to the mechanical stiffness discrepancy between the casing (e.g., a steel casing) and the sand formation, at the interface between the casing and the sand, the diameter of the tunnel in the sand increases dramatically. As the bullet travels through the sand formation, the diameter of the perforation tunnel rapidly decreases to a regular value which is approximately the same as the diameter of the bullet. During this process, the formation at the perforation location, and surrounding the perforation tunnel, is squeezed plastically.

This process, from the instant of shooting the bullet to the instant of completing the formation of the perforation tunnel, is hard to reproduce in detail with numerical modeling. However, for the purposes of this document, and to solve the problem (of determining an accurate value of CVPDD, and hence, the risk of sanding) it is not necessary to simulate the process in detail. Here, an accurate representation of the stress field around the perforation tunnel can be developed for input to a sanding analysis by ignoring the plastic (compaction) strain caused by perforation, since there is no significant impact on the sequential activity of pressure draw-down. Consequently, two points can be used to provide a technical solution to this technical problem: 1) the stress concentration obtained using a numerical simulation of the perforation process is accurate, and can be used as-is; 2) the value of plastic strain $\bar{\varepsilon}_0^p$ obtained using a basic numerical simulation of the perforation process is not accurate; the amount of plastic strain $\bar{\varepsilon}_0^p$ obtained in this manner should be separated from the total value of plastic strain that occurs during the activity of pressure draw-down in order to have an accurate estimation of the risk of sanding.

Thus, in most embodiments, a simplified numerical scheme is established to provide an accurate calculation of the CVPDD over three dimensions, for a well with casing completion in weak sand formations. The CVPDD is defined herein as the value of pressure draw-down at which harmful sanding starts to occur. Thus, monitoring CVPDD, and controlling various apparatus to adjust the monitored value of the CVPDD, are activities that can be used to increase hydrocarbon production, while reducing the risk of sanding. The results of the calculations accomplished herein (e.g., determining the PEEQ, or equivalent plastic strain, which is a strain intensity index used in calculation of plasticity) can be used to control draw-down pressure, to avoid reaching a pressure that exceeds the CVPDD. Thus, in some embodiments, the determined value of PEEQ can be used to control draw-down pressure produced by a pump that is used to extract hydrocarbons from a formation. Various embodiments enable determination of the CVPDD which is more accurate than conventional solutions, leading to higher efficiency in hydrocarbon recovery operations. The details of various embodiments will now be described.

Fundamental Concepts

In some embodiments, a scheme for determining the CVPDD in a well with casing completion in weak sand formation involves simulating various activities that impact the magnitude and distribution of stress around the well and perforation tunnels. These activities include drilling the well with a given drilling mud weight, installation and cementing the casing; tunnel creation via perforation; and pressure draw-down. Several simplifications may be implemented, to improve the speed of calculation, as well as the efficiency of the overall process.

For example, drilling the well may be modeled via element removal. That is, the portion of the formation removed by drilling may be represented using a finite element mesh that is removed from the body of the model. The pressure due to mud weight can be applied to the borehole surface to maintain stability.

In another example, casing installation and cementing can be jointly represented by the introduction of a set of displacement constraints and non-permeable boundary conditions on the borehole surface.

In a further example, the act of creating perforation tunnels can also be modeled via element removal. In this case, the part of formation removed when the tunnel is formed may be represented by a finite element mesh that is removed from the body of the model. Pressure of the fluid present downhole (e.g., oil and/or gas) can be applied to the surface of the tunnel to maintain stability. No dynamic process is simulated.

In a final example, a single pair of perforation tunnels may be used for the sub-model portion of the analysis. This simplification is driven by the finding that the plastic region around one perforation tunnel doesn't connect to the plastic region of a neighboring tunnel when draw-down pressure is applied. Therefore, this simplification captures the porous elasto-plastic mechanical behaviour of the formation around perforation tunnels, while reducing the computational burden.

It should be noted that the choice of perforation tunnel direction in the model impacts the CVPDD value: the CVPDD obtained with a perforation tunnel having an axial direction aligned with the minimum horizontal stress Sh is lower than the CVPDD obtained with a perforation tunnel that is aligned with the direction of maximum horizontal stress. In some embodiments, the minimum value is selected to implement a more conservative approach.

In order to obtain greater accuracy and efficiency, a sub-modeling technique is adopted. This includes determining the initial geostress field around the perforation tunnels and the well.

Figure 2:
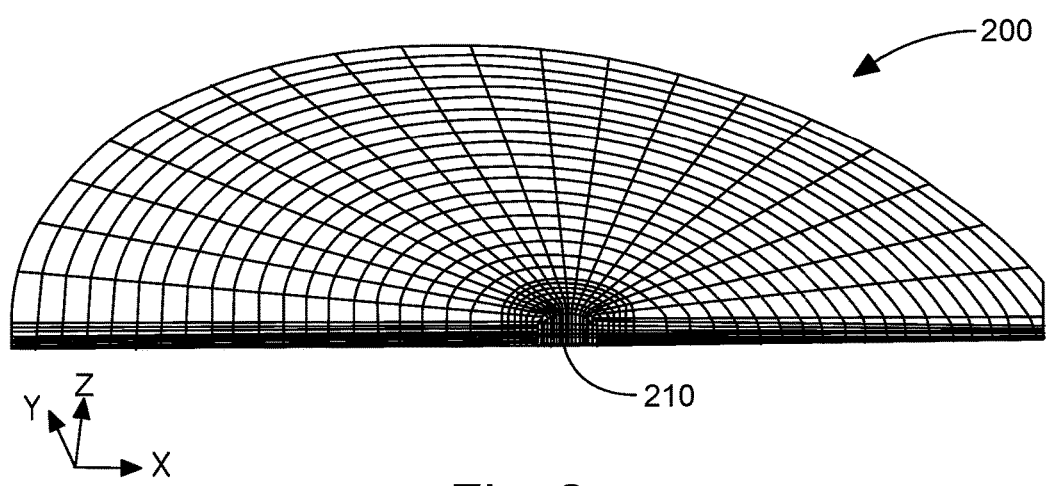
FIG. 2 illustrates building a sub-model of the field in FIG. 1, including a well, according to various embodiments.
Figures 3, 4:
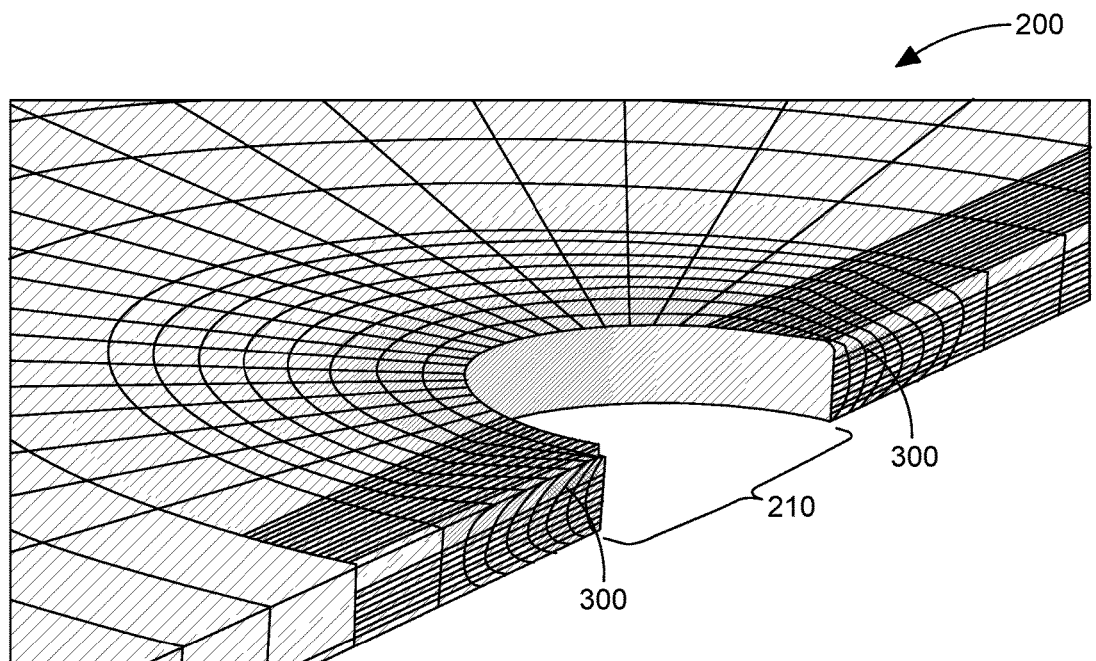
FIG. 3 illustrates the formation of perforation tunnels, to determine the distribution of stress and strain for the sub-model of FIG. 2, according to various embodiments.
FIG. 4 is a traffic light presentation of equivalent plastic strain, correlated to an estimated risk of sanding, according to various embodiments.

FIG. 1 illustrates building a three-dimensional (3D) global model of a field 100, according to various embodiments. FIG. 2 illustrates building a sub-model 200 of the field 100 in FIG. 1, including a well 210, according to various embodiments. FIG. 3 illustrates the formation of perforation tunnels 300, to determine the distribution of stress and strain for the sub-model 200 of FIG. 2, according to various embodiments. FIG. 4 is a traffic light presentation 400 of equivalent plastic strain, correlated to an estimated risk of sanding, according to various embodiments. FIGS. 1-4 combine to present a flow diagram of the numerical scheme proposed for prediction of CVPDD values for weak sand formations over three dimensions.

In FIG. 1, the workflow to implement the numerical scheme to determine the CVPDD for a well in a weak sand formation begins. In a first activity, a 3D global model of the field 100 is built using any available finite element modeling tool. These are well-known to those of ordinary skill in the art, and include Abaqus/CAE software (hereinafter "Abaqus/CAE"), available from Dassault Systèmes of Waltham, Mass. in the United States of America, among others. The global model of the field 100 includes a determination of the initial geo-stress distribution for the field 100. Here the field displacement vectors have a value of zero, and are normal to the surface at the boundaries of the model. The scale of the field 100 is usually on the order of several kilometers.

In FIG. 2, a sub-model 200 is built at reservoir level. The scale for the sub-model 200 is on the order of several meters. Here the values of stress components for the region covered by the sub-model 200 are extracted from the 3D numerical stress results obtained using the global model of the field 100. The center of the sub-model 200 should be located approximately where perforation occurs, so that perforation tunnels (see tunnels 300 in FIG. 3) are included. The values of stress components and displacement vectors from the global model of the field 100 are applied as boundary conditions to the sub-model 200.

In FIG. 3, certain field activities are simulated, and a porous elasto-plastic transient consolidation calculation is performed using a finite element tool (e.g., Abaqus/CAE) to find the distribution of stress and plastic strain at a given draw-down pressure.

To simulate a well drilling process, the part of the formation that would occupy the wellbore is removed.

Drilling mud pressure is applied to the wellbore surface that appears after the removal operation.

To simulate perforation activity in the formation, the part of the formation that would occupy the tunnels that are formed by perforation are removed. Fluid pressure is applied on the surface of the tunnel that is created. Pore pressure boundary conditions are also applied to the surface of the perforation tunnels.

To apply a set of values of pressure draw-down to the surface of the perforation tunnel, transient consolidation (i.e., consolidating fluid pressure and pore pressure results) is accomplished using a coupled hydro-mechanical finite element tool, such as Abaqus software.

In FIG. 4, the numerical solution provided by the finite element tool is analyzed. A traffic light presentation 400 of the results are used here to determine the values of CVPDD associated with various levels of sanding risk. This analysis will be discussed in more detail below.

First, the value of equivalent plastic strain generated by each given value in a set of draw-down pressures is determined. In each case, this value is the increment amount of plastic strain equal to the amount of total plastic strain minus the plastic strain generated when the tunnel is created via perforation.

The value of plastic strain generated by pressure draw-down, $\bar{\varepsilon}^p$ is compared with the specific critical value of equivalent plastic strain $\bar{\varepsilon}_c^p$ (CVPS). If $\bar{\varepsilon}^p > \bar{\varepsilon}_c^p$, then the value of pressure draw-down is higher than the CVPDD. If $\bar{\varepsilon}^p < \bar{\varepsilon}_c^p$, then the value of pressure draw-down is less than the CVPDD. The value of CVPDD is the same as the draw-down pressure, then the corresponding generated plastic strain $\bar{\varepsilon}^p = \bar{\varepsilon}_c^p$.

The critical value of equivalent plastic strain $\bar{\varepsilon}_c^p$ is a material parameter with a value that depends on grain size, mineral content, permeability, porosity, saturation, and lithological history of the formation, among other factors. The value of $\bar{\varepsilon}_c^p$ can be calibrated using existing sanding phenomena. For example, (a) when sanding occurs in the field, the draw-down pressure can be measured; (b) core test results that show the existence of sanding can be used; and/or (c) values can be assumed using experience gained from other, similar field formations. In this way, the value of equivalent plastic strain $\bar{\varepsilon}_c^p$ can be determined, and used to control operations in real-time.

Example Application

The data used in the following example is provided solely to illustrate one possible application, and is not to be taken in a limiting context. Data values are similar to what might be obtained in an offshore well environment.

Figure 5:
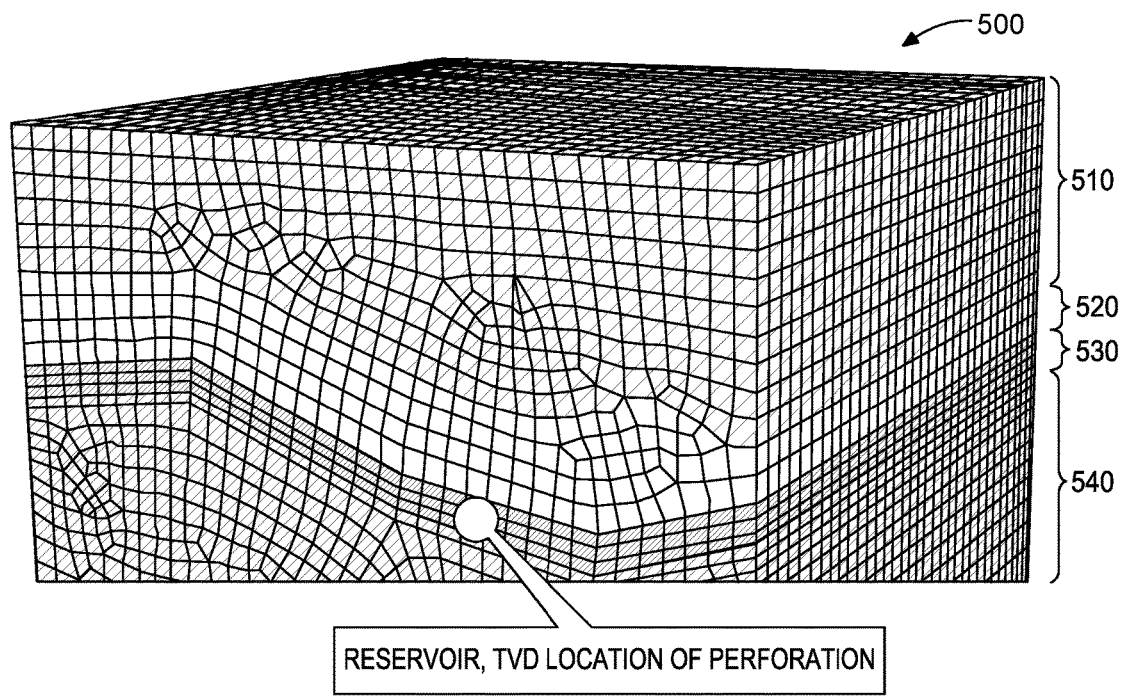
FIG. 5 is a perspective view of an example field-scale global model, similar to the model of FIG. 1, according to various embodiments.

FIG. 5 is a perspective view of an example field-scale global model 500, similar to the model 100 of FIG. 1, according to various embodiments. Here the global model 500 is divided into four vertical formation layers: a first upper layer 510, a second upper layer 520, a third reservoir layer 530, and a fourth lower layer 540. The total depth of the model 500 is 3000 m, with a width of 5000 m, and a length of 5000 m. The reservoir layer 530 has a thickness ranging from about 50 m to 150 m. The lithology of the reservoir formation is Middle Miocene. The center of the well's perforation section is located at TVD=4100 m, with an environment of 1500 m water depth. This value of TVD corresponds to a location of 2600 m from the top of the model.

The global model 500 has been simplified to include four kinds of materials, corresponding to the four layers 510, 520, 530, 540. The corresponding material parameters are listed in Table I.

TABLE I

| Layer | ρ/kg/m³ | E/GPa | ν |
|---|---|---|---|
| Upper and Surrounding Formations (i.e., layers 1 and 2) | 2,150 | 1.9 to 6 | 0.2 to 0.3 |
| Lower Formation (i.e., layer 4) | 2,300 | 6 | 0.25 to 0.3 |
| Reservoir i.e., layer 3) | 2,100 | 1 to 5 | 0.26 to 0.28 |

A mean stress-dependent relationship was adopted for the values of Young's modulus, as well as for Poisson's ratio. Therefore, the values of Young's modulus and Poisson's ratio are characterized by ranges, instead of a specific value. The values of each increase as depth increases.

An elasto-plastic model, which is well-known to those of ordinary skill in the art, is used for the reservoir formation (layer 3), and an elastic model is used for formations other than reservoir (layers 1, 2, and 4). Mohr-Coulomb plastic yielding criterion is adopted in the calculation. Values of strength parameters for the reservoir formation, including internal friction angle and cohesive strength, are shown in Table II.

TABLE II

| TVD (m) | Friction Angle (degrees) | Cohesive Strength (MPa) |
|---|---|---|
| 4100 | 28 | 2.2 |

The field-level analysis provided by the global model 500 provides a set of accurate boundary conditions that can be applied to a sub-model for the local section of the well that includes perforation tunnels. To simplify calculations without losing accuracy, it is assumed that only the part of the reservoir formation is permeable. Consequently, a coupled analysis for deformation and porous flow is made only in the region covered by the model 500 (e.g., over a range of kilometers). Other parts of the global model 500 are assumed to be non-permeable.

Figure 6:
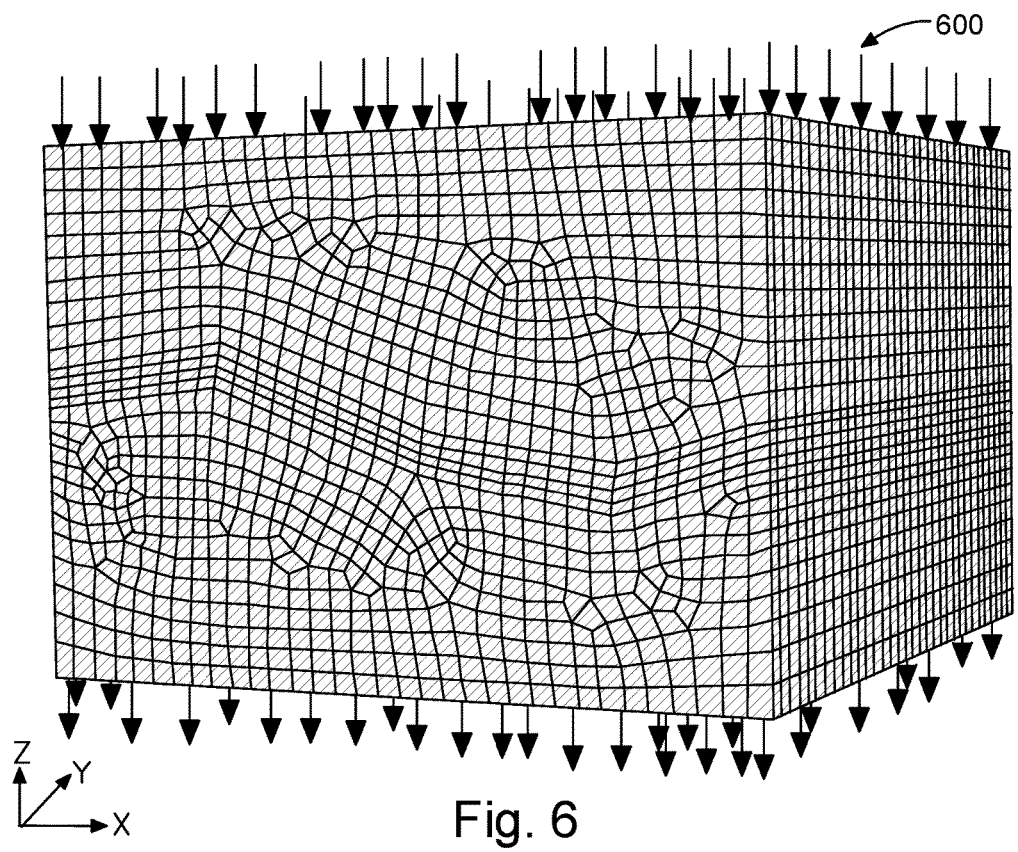
FIG. 6 illustrates some of the loads and boundary conditions on the global model of FIG. 5, according to various embodiments.

FIG. 6 illustrates some of the loads and boundary conditions 600 on the global model of FIG. 5, according to various embodiments. Here the initial pore pressure within the reservoir formation is assumed to be about 42 MPa. As shown in FIG. 6, the loads and boundary conditions of the model at field scale include: seawater pressure; and self-gravity of formations, balanced by the initial geostress. Zero-displacement constraints are applied to the four lateral sides and the underside of the model. The well is not part of the global model at the field scale level.

Neglecting the details of the calculation process for the global model, which are well-known to those of ordinary skill in the art, the geostress solution obtained with the global model at the location of the center of the well where perforation occurs within the reservoir (TVD=4100 m) is given in Table III, along with the values of pore pressure. These stress solutions include the minimum horizontal stress Sh, the maximum horizontal stress SH, and the vertical stress SV. These stress component values are given in terms of total stress.

TABLE III

| TVD (m) | Sh (MPa) | SH (MPa) | SV (MPa) | Pore Pressure (MPa) |
|---|---|---|---|---|
| 4100 | 54.3 | 55.9 | 57.5 | 42 |

Figure 7:
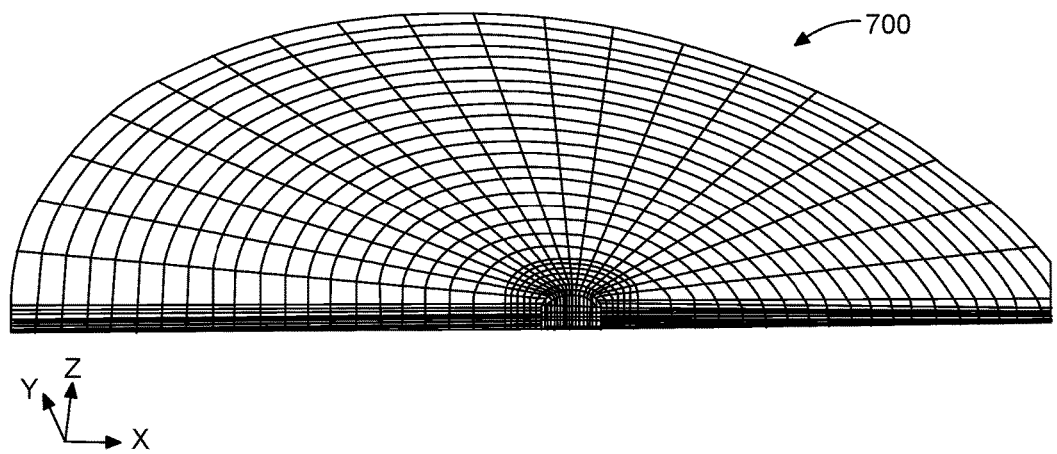
FIG. 7 is a semi-circular slice of the sub-model geometry, accounting for conditions within a portion of the field shown in FIG. 5, according to various embodiments.

FIG. 7 is a semi-circular slice of the sub-model geometry 700, accounting for conditions within a portion of the field shown in FIG. 5, according to various embodiments. Here a 3D sub-model has been built to calculate the CVPDD, including the details of perforation tunnels (which are not visible in this figure, but see FIG. 8 for more detail). In order to reduce the computation burden, and increase accuracy, the symmetrical nature of the problem permits a semi-circular slice of the sub-model geometry 700 to be adopted, instead of a complete circular slice.

Figure 8:
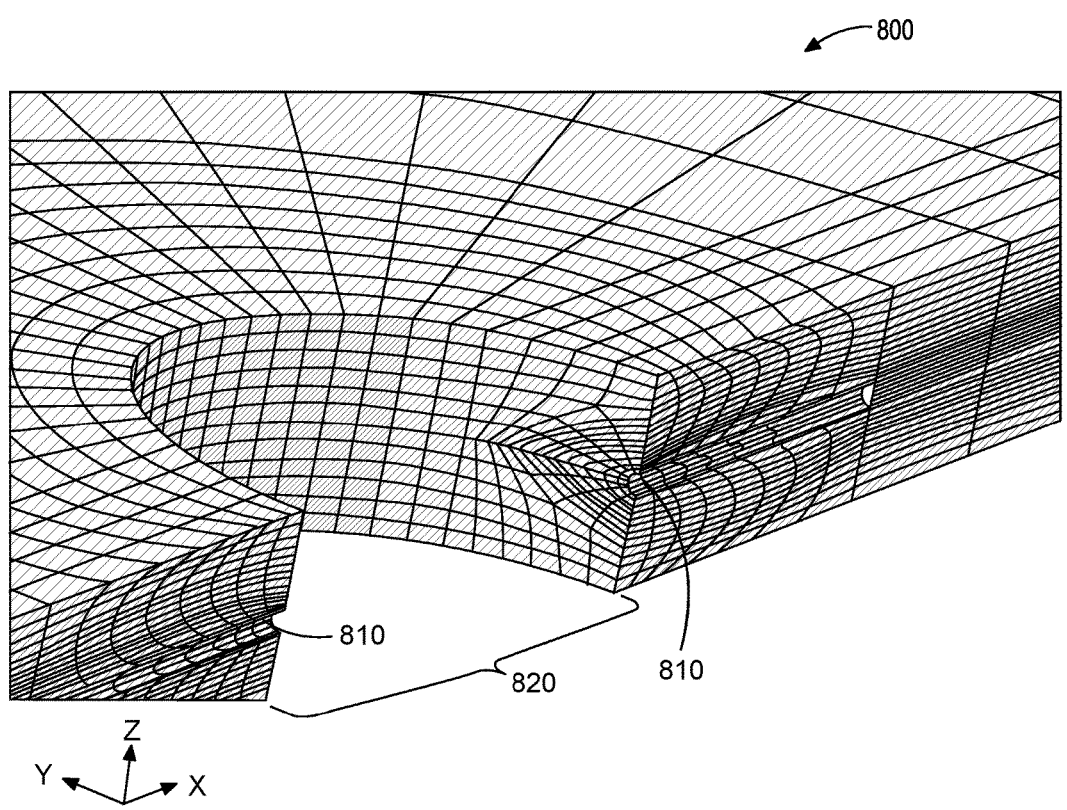
FIG. 8 is a close-up view of the sub-model geometry of FIG. 7, including perforation tunnels, according to various embodiments.

FIG. 8 is a close-up view 800 of the sub-model geometry of FIG. 7, including perforation tunnels 810, according to various embodiments. In this figure, two perforation tunnels 810 located in the center of the symmetry plane can be seen.

The geometries of the well 820 and perforation tunnels 810 are discretized by the mesh shown in FIGS. 7 and 8. A finer mesh was adopted for the area proximate to the tunnels 810 and the well 820.

The thickness of the slice represented by the sub-model is about 0.13 m (about 5 inches), and the external diameter is 6 m. The diameter of the well 820 is about 0.37 m (about 14.5 inches). The diameter of the perforation tunnels are about 0.013 m (about 0.5 inches), with a length of about 0.25 m (about 10 inches). These portions of the formation that are removed by drilling and perforation (i.e., the rock within the location of the well 829, and the rock within the location of the perforation tunnels 810) are permitted to remain in the model to determine initial geostress balancing with various loads. Thereafter, these portions are removed to simulate the activities of drilling and perforation, and element removal is applied in the calculations. As a consequence, a dual-stress concentration around the perforation tunnel is formed.

In the sub-model, only one pair of perforation tunnels 810 are included. This simplification is made on the basis of the primary results of analysis, where it is determined that the plastic region around one perforation tunnel 810 doesn't connect to the plastic region of a neighboring tunnel 810 during the process of pressure draw-down. Therefore, this simplification captures the poro-elastoplastic mechanical behaviour of the formation around the perforation tunnels with reduced computational burden.

It is noted here that for the case of a vertical well or horizontal well, one quarter of the circular model (see FIG. 10) can also be used instead of the half-circular model. The symmetry of the stress field satisfies the conditions for this simplification as well. Thus, at least one perforation tunnel is modeled. However, it may be easier to use a half-circular model, with two tunnels 810, since it provides a better visualization of the numerical solution, and is easier to evaluate. This is often the case for an inclined well section, where a half-circular model can improve the accuracy of the solution.

Loading in the sub-model includes the overburden pressure applied on the top surface of the sub-model, and the pressure loading to the tunnel surface during the pressure draw-down. The value of overburden pressure applied on the top surface of the model is 57.5 MPa, which is equal to the value of vertical stress SV. Pressure draw-down is simulated by varying the pore pressure boundary condition at the perforation tunnel surface along with variation of the pressure applied on the tunnel surface as traction pressure.

Displacement constraints on all surfaces except the inner well surface and perforation tunnel surfaces are derived from the numerical results of the global model at field scale, shown in FIG. 5. On the surface of the well, displacement constraints have been applied to simulate the rigidity of the casing and cementing during pressure draw-down.

A set of pressures for draw-down activity are applied on the surface of the perforation tunnel(s), subsequently corresponding to various values of draw-down pressure. This application sets the pore pressure boundary condition at the surface of the perforation tunnel(s). Gravity loading and initial stress are applied to the entire sub-model.

To determine the plastic strain on the sub-model under a given draw-down pressure, the set of data values given in Table I, Table II, and Table III were applied to the sub-model of FIGS. 7 and 8, using 3D porous elasto-plastic calculations performed with Abaqus/CAE software.

Figure 9:
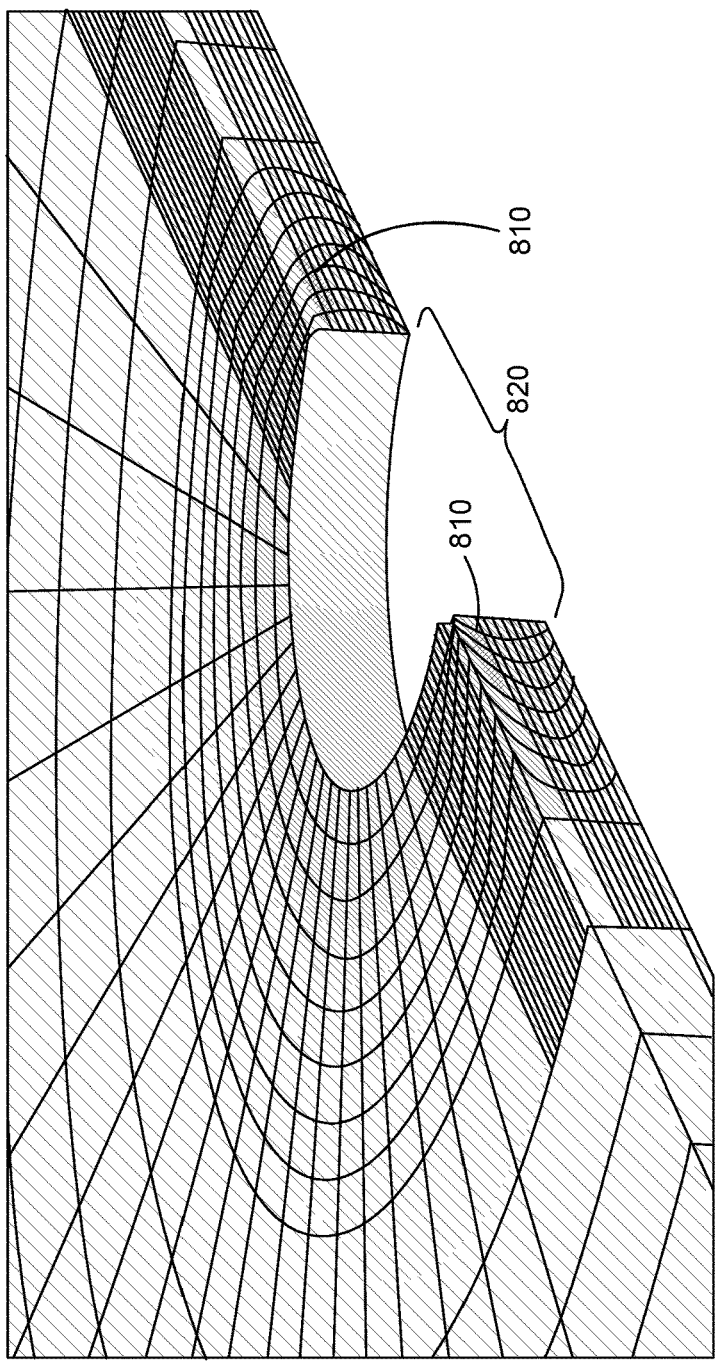
FIG. 9 illustrates the dual-stress concentration phenomenon surrounding the perforation tunnels shown in FIG. 8, according to various embodiments.

FIG. 9 illustrates the dual-stress concentration phenomenon surrounding the perforation tunnels 810 shown in FIG. 8, according to various embodiments. Here the draw-down pressure is set to a value of 3 Mpa. A first stress concentration occurs around the well 820 due to drilling, and a second stress concentration appears in the area where perforation tunnels penetrate through the stress concentration area formed by drilling. This dual stress-concentration results in the value of stress in the area close to the point of tunnel penetration being significantly higher than the value of stress away from the point of penetration, such as at the surface of the well. The term "S, Mises" in FIG. 9 stands for the Von Mises stress, which is a stress intensity index used for calculation of plasticity.

Figure 10:
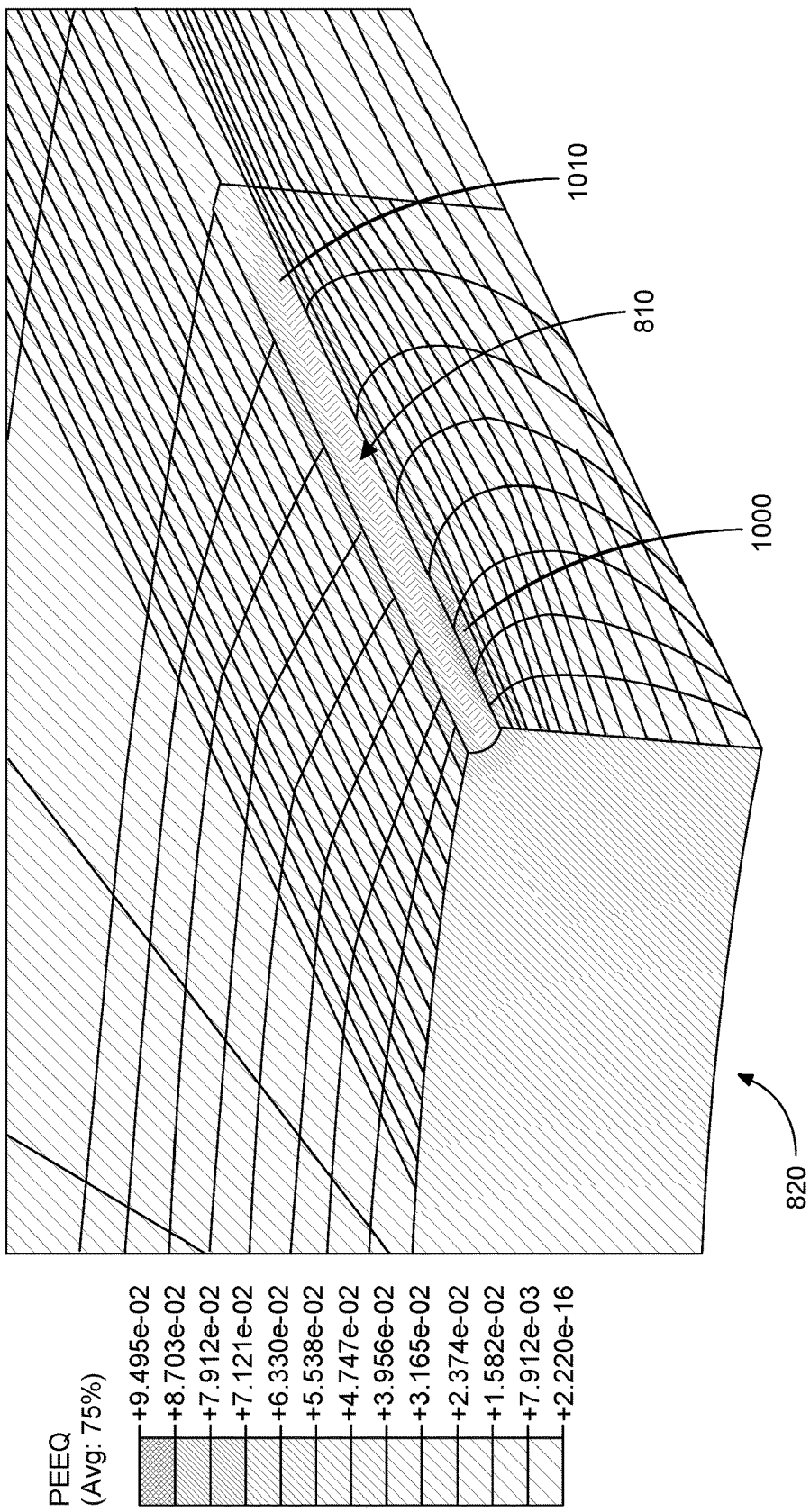
FIG. 10 is a close-up view of the equivalent plastic strain distribution for one perforation tunnel shown in FIG. 8, according to various embodiments.

FIG. 10 is a close-up view of the equivalent plastic strain distribution for one perforation tunnel 810 shown in FIG. 8, according to various embodiments. Here a distribution 1000 of the total equivalent plastic strain due to the application of draw-down pressure, together with the impact of drilling perforation, can be seen. The term Peeq stands for the equivalent plastic strain, which is a strain intensity index used in the calculation of plasticity. Due to the stress concentration around well 820, the contour of the total Peeq operates over a range which is much larger than the diameter of the well. In addition, the value of Peeq in the section close to the exit 1000 of the tunnel 810 is much larger than at a location 1010 away from the exit 1000. This phenomenon can also be explained by the presence of the dual-stress-concentration.

In Table IV below, the values of Peeq are shown together with corresponding values of draw-down pressure. The critical value of the equivalent plastic strain (CUPS) is given here as 0.03, or 3%. In some embodiments, a traffic light system is introduced. Thus, when the value of draw-down pressure is less than the CVPS, the corresponding table entries might be colored green, so that operations might continue as they are. When the draw-down pressure is greater than the CVPS, but the difference is less than 1%, those table entries might be colored yellow—which could be interpreted as an area where a decrease in draw-down pressure might be useful. And for draw-down pressure values where the value of plastic strain is greater than 1% above the CVPS, the table entries can be colored red, which might mean that draw-down pressure should be immediately reduced.

TABLE IV

| PP (MPa) | PDD (MPa) | Peeq (%) | Total Peeq | Peeq | CVPS (%) |
|---|---|---|---|---|---|
| 42 | 0 | 0 (green) | 0.07138 | 0 | 3 |
| 41 | 1 | 2.412 (green) | 0.095 | 0.02412 | |
| 40 | 2 | 2.788 (green) | 0.09926 | 0.02788 | |
| 39 | 3 | 3.212 (yellow) | 0.1035 | 0.03212 | |
| 38 | 4 | 3.692 (yellow) | 0.1083 | 0.03692 | |
| 37 | 5 | 4.242 (red) | 0.1138 | 0.04242 | |
| 36 | 6 | 4.852 (red) | 0.1199 | 0.04852 | |
| 35 | 7 | 5.512 (red) | 0.1265 | 0.05512 | |
| 34 | 8 | 6.192 (red) | 0.1333 | 0.06192 | |

In this example, the CVPDD is 2 MPa. A draw-down pressure which is less than 2 MPa should be free from a risk of sanding. For draw-down pressures which are greater than the CVPDD, but the plastic strain is less than 1% above the CVPS, sanding should be controllable. Related sand protection measures such as screening net placement might be suggested. For draw-down pressures higher than the CVPDD, where the amount of resultant plastic strain is more than 1% above the CVPS, the draw-down pressure may be too great for efficient operation. These and other values of CVPS, cautionary practices, and interpretations may be used, with some providing useful financial advantages. Thus, additional embodiments may be realized.

Logging System

Figure 11:
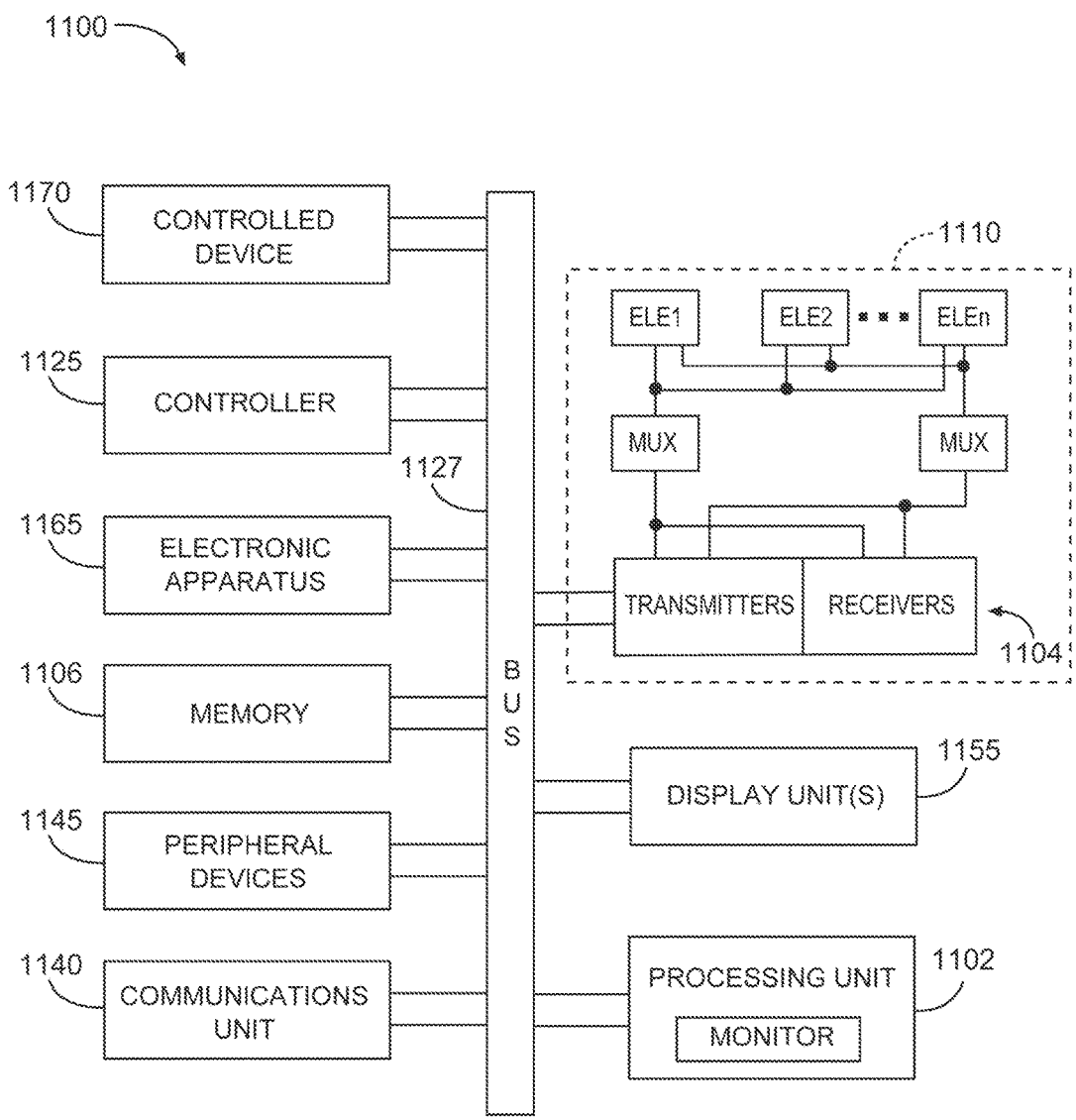
FIG. 11 is a block diagram of a data acquisition, processing, and control system according to various embodiments.

FIG. 11 is a block diagram of a data acquisition, processing, and control system 1100 according to various embodiments. Here it can be seen that the system 1100 may further include one or more sensor elements ELE1, ELE2, ... ELEn, perhaps coupled to data transmitters and receivers (TRANSMITTERS and RECEIVERS, respectively) as part of a measurement device 1104. When configured in this manner, the logging system 1100 can receive measurements and other data (e.g., location and draw-down pressure information) from sensor elements ELE1, ELE2, ... ELEn. The device 1104 can be located on the surface of the Earth, or downhole, perhaps attached to a housing 1110.

The processing unit 1102 can couple to the measurement device 1104 to obtain measurements from the measurement device 1104, and its components, as described earlier herein. In some embodiments, a logging system 1100 comprises a housing that is attached to or contains the device 1104, and other elements. The housing 1110 might take the form of a wireline tool body, or a downhole tool as described in more detail below with reference to FIGS. 13 and 14. The processing unit 1102 may be part of a surface workstation or attached to a downhole tool housing. In some embodiments, the processing unit 1102 is packaged within the housing 1110.

The logging system 1100 can include a controller 1125, other electronic apparatus 1165, and a communications unit 1140. The controller 1125 and the processing unit 1102 can be fabricated to operate the measurement device 1104 to acquire measurement data, such as signals representing sensor measurements.

The controller 1125 may operate to control a controlled device 1170, either directly, or using commands from the processing unit 1102. The controlled device might take the form of a pump in some embodiments, to directly control the draw-down pressure. In some embodiments, the controlled device 1170 might take the form of an alarm, to be activated in response to the activity of a monitoring element MONITOR that is used to observe draw-down pressures and compare them with the CVPS, or values derived from the CVPS.

Electronic apparatus 1165 (e.g., electromagnetic sensors, current sensors) can be used in conjunction with the controller 1125 to perform tasks associated with taking measurements downhole. The communications unit 1140 can include downhole communications in a drilling operation. Such downhole communications can include a telemetry system.

The logging system 1100 can also include a bus 1127 to provide common electrical signal paths between the components of the logging system 1100. The bus 1127 can include an address bus, a data bus, and a control bus, each independently configured. The bus 1127 can also use common conductive lines for providing one or more of address, data, or control, the use of which can be regulated by the controller 1125.

The bus 1127 can include instrumentality for a communication network. The bus 1127 can be configured such that the components of the logging system 1100 are distributed. Such distribution can be arranged between downhole components such as the measurement device 1104 and components that can be disposed on the surface of a well. Alternatively, several of these components can be co-located, such as on one or more collars of a drill string or on a wireline structure.

In various embodiments, the logging system 1100 includes peripheral devices that can include displays 1155, additional storage memory, or other control devices that may operate in conjunction with the controller 1125 or the processing unit 1102. The display 1155 can display diagnostic and measurement information, based on the signals generated according to embodiments described above.

In an embodiment, the controller 1125 can be fabricated to include one or more processors. The display 1155 can be fabricated or programmed to operate with instructions stored in the processing unit 1102 (for example in the memory 1106) to implement a user interface to manage the operation of the system 1100, as well as components distributed within the logging system 1100. This type of user interface can be operated in conjunction with the communications unit 1140 and the bus 1127. Various components of the logging system 1100 can be integrated with the sensor elements HE, ELE2, ... ELEn and the housing 1110, such that processing identical to or similar to the methods discussed previously, and those that follow, with respect to various embodiments that are described herein.

Methods

In various embodiments, a non-transitory machine-readable storage device can comprise instructions stored thereon, which, when performed by a machine, cause the machine to become a customized, particular machine that performs operations comprising one or more features similar to or identical to those described with respect to the methods and techniques described herein. A machine-readable storage device, herein, is a physical device that stores information (e.g., instructions, data), which when stored, alters the physical structure of the device. Examples of machine-readable storage devices can include, but are not limited to, memory 306 in the form of read only memory (ROM), random access memory (RAM), a magnetic disk storage device, an optical storage device, a flash memory, and other electronic, magnetic, or optical memory devices, including combinations thereof.

The physical structure of stored instructions may be operated on by one or more processors such as, for example, the processing unit 1102. Operating on these physical structures can cause the machine to become a specialized machine that performs operations according to methods described herein. The instructions can include instructions to cause the processing unit 1102 to store associated data or other data in the memory 1106. The memory 1106 can store the results of measurements of formation and casing/tubing parameters, to include gain parameters, calibration constants, identification data, sensor location information, etc. The memory 1106 can store a log of the measurement and location information provided by the measurement device 1104. The memory 1106 therefore may include a database, for example a relational database.

Figure 12:
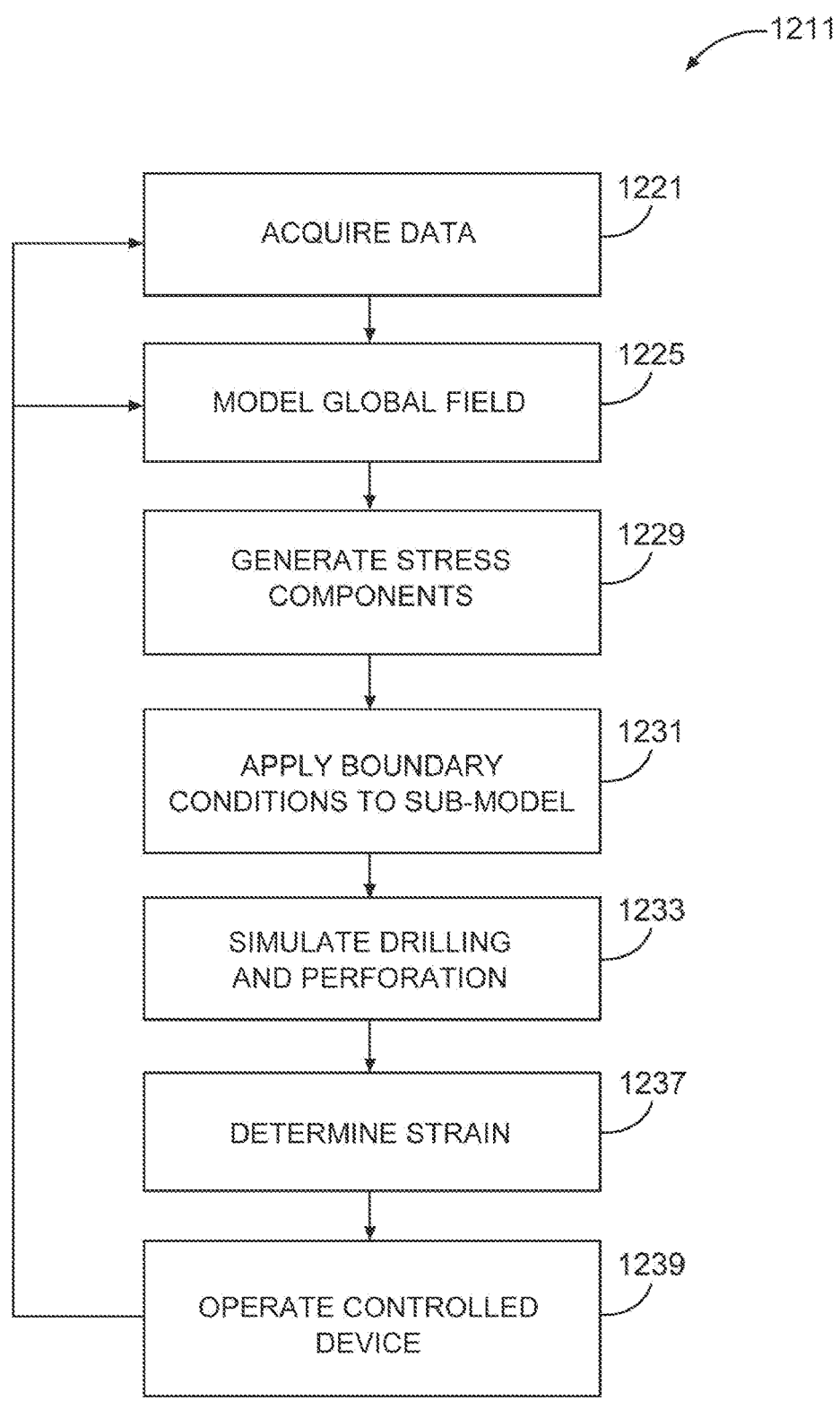
FIG. 12 is a flow diagram illustrating data acquisition, processing, and control methods, according to various embodiments.

FIG. 12 is a flow diagram illustrating data acquisition, processing, and control methods 1211, according to various embodiments. The methods 1211 described herein are with reference to the apparatus and systems shown in FIGS. 1-11. Thus, in some embodiments, a method 1211 comprises determining strain in a perforated portion of a well at block 1237, based on a series of activities, including global modeling of a field that includes the well location (e.g., at blocks 1225 and 1227), and local modeling of the perforated portion, with boundary conditions set by the global model, and local drilling and perforating modeled using simplifying assumptions (e.g., at blocks 1231 and 1233). Many variations may be realized.

For example, in some embodiments, a method 1211 begins at block 1221 with acquiring data to support a modeling effort. This data might be acquired in the field, or from simulations. For example, in some embodiments, the equivalent plastic strain associated with a draw-down pressure sufficient to induce sanding can be determined in a number of ways. Thus, the activity at block 1221 may include determining the equivalent plastic strain associated with a pressure draw-down sufficient to induce sanding by using one of data associated with actual sanding that occurs in the field, or core test results specific to sanding, and/or an assumed value based on experience in other locations.

Stress components in the global field can be determined by modeling the global field, which includes the well. Thus, in some embodiments, the method 1211 include modeling the global field with the global field model at block 1225, and calculating a geo-stress distribution within the global field to generate the stress components at block 1229.

The method 1221 may continue on to block 1231 to include setting boundary conditions at the surface of the well, near the site of perforation activity, using the results of the global modeling. For example, perforation tunnel surface boundary conditions may include pore pressure. Thus, simulating the pressure addition for one or more perforation tunnels may comprise using pore pressure to set a boundary condition at the tunnel surface.

The well drilling process and tunnel perforating process can be modeled, in part, by removing the associated formation elements that no longer exist when the processes are complete. In In the global model, there are no details of wellbore and perforation tunnels. Instead, the global model accounts for the details of the included formations. As noted previously, a sub-model is used to account for the details of the well and perforation tunnels. The sub-model is thus used to simulate the drilling process and tunnel perforating process by removing formation elements that occupy the respective locations of the well and perforation tunnel. As a result of the two simulated operations, dual stress concentrations appear in the numerical solution of stress contours.

Thus, in some embodiments, the method 1211 continues on to block 1233 to include simulating, with a sub-model, the well drilling process by removing formation elements that occupy the well location; and simulating, with the sub-model, the tunnel perforating process by removing formation elements that occupy a location of the at least one perforation tunnel.

Once the well and perforation tunnel elements are removed, appropriate pressure can be added to the surfaces involved in the well and the perforation tunnel(s). Thus, the activity at block 1233 may comprise first, simulating pressure addition to the well using mud weight applied to the well surface, and second, simulating pressure addition to the at least one perforation tunnel using hydrocarbon fluid pressure applied to a tunnel surface.

Fluid pressure and pore pressure can be consolidated. Thus, when the set of draw-down pressures are applied to the surface of the perforation tunnel(s), the activity at block 1233 may comprise calculating transient consolidation of fluid pressure and pore pressure distribution within a sub-model associated with the global field model.

The method 1211 may continue on to block 1237 to include determining a value of strain in a perforated portion of a well by applying a set of draw-down pressures to a surface of at least one perforation tunnel in the perforated portion, wherein the perforated portion has been modeled using stress components provided by a global field model that includes a location of the well to set boundary conditions at a surface of the well. As part of this activity, the well drilling process and the tunnel perforating process have been modeled with element removal and pressure addition for the perforated portion. The strain determined by the method at block 1237 may comprise an equivalent plastic strain.

Porous elasto-plastic calculations using a variety of parameters can be used to determine the strain values at a particular depth. Thus, the activity of determining the strain at block 1237 may comprise performing porous elasto-plastic calculations using material parameters associated with the global field model, strength parameters of a reservoir formation within the global field model, and pore pressure within the perforated section of the well.

Displacement constraints derived from the global mode can be applied to a variety of surfaces, but not the well or perforation tunnel surfaces. Thus, in some embodiments, as part of the activity at block 1237, displacement constraints derived from the global model are not applied to the surface of the well and the surface of the perforation tunnel.

Stress components can include a variety of elements, including a range of stress, such as a range of horizontal stress and/or a range of vertical stress (e.g., a minimum and maximum horizontal stress Sh, SH and vertical stress SV).

As part of the method activities, incremental strain values associated with sanding may be determined. Thus, some portion of the activities at block 1237 may comprise determining an incremental plastic strain equal to the total plastic strain minus the plastic strain generated when the perforation tunnel is formed.

In some embodiments, the method 1211 may continue on to block 1239 to include operating a controlled device based on the value of strain. For example, the determined value of strain can be used to control hydrocarbon extraction operations. Thus, in some embodiments, operating the controlled device at block 1239 comprises controlling a pump to adjust the value of strain.

The strain values determined at block 1237 can be published for viewing, perhaps in the form of 2D or 3D graphs. Thus, in some embodiments, operating the controlled device at block 1239 comprises publishing the value(s) of strain in a human-readable form.

The determined strain may be compared to a strain value associated with sanding conditions, which may be the total amount of plastic strain minus the plastic strain generated when perforating the tunnel. Thus, in some embodiments, operating the controlled device at block 1239 comprises comparing the strain as an equivalent plastic strain generated by the draw-down pressures to an equivalent plastic strain associated with a pressure draw-down sufficient to induce sanding.

An alarm may be triggered if the draw-down pressure becomes too high. Thus, in some embodiments, operating the controlled device at block 1239 comprises triggering an audio or visual alarm to indicate the equivalent plastic strain generated by the draw-down pressures is greater than a threshold value related to the equivalent plastic strain associated with a pressure draw-down sufficient to induce sanding. Many other embodiments may be realized.

It should be noted that the methods described herein do not have to be executed in the order described, or in any particular order. Moreover, various activities described with respect to the methods identified herein can be executed in iterative, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program, to perform the methods described herein. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those of ordinary skill in the art, such as application program interfaces or inter-process communication techniques, including remote procedure calls. The teachings of various embodiments are not limited to any particular programming language or environment. Thus, other embodiments may be realized.

Systems

Figure 13:
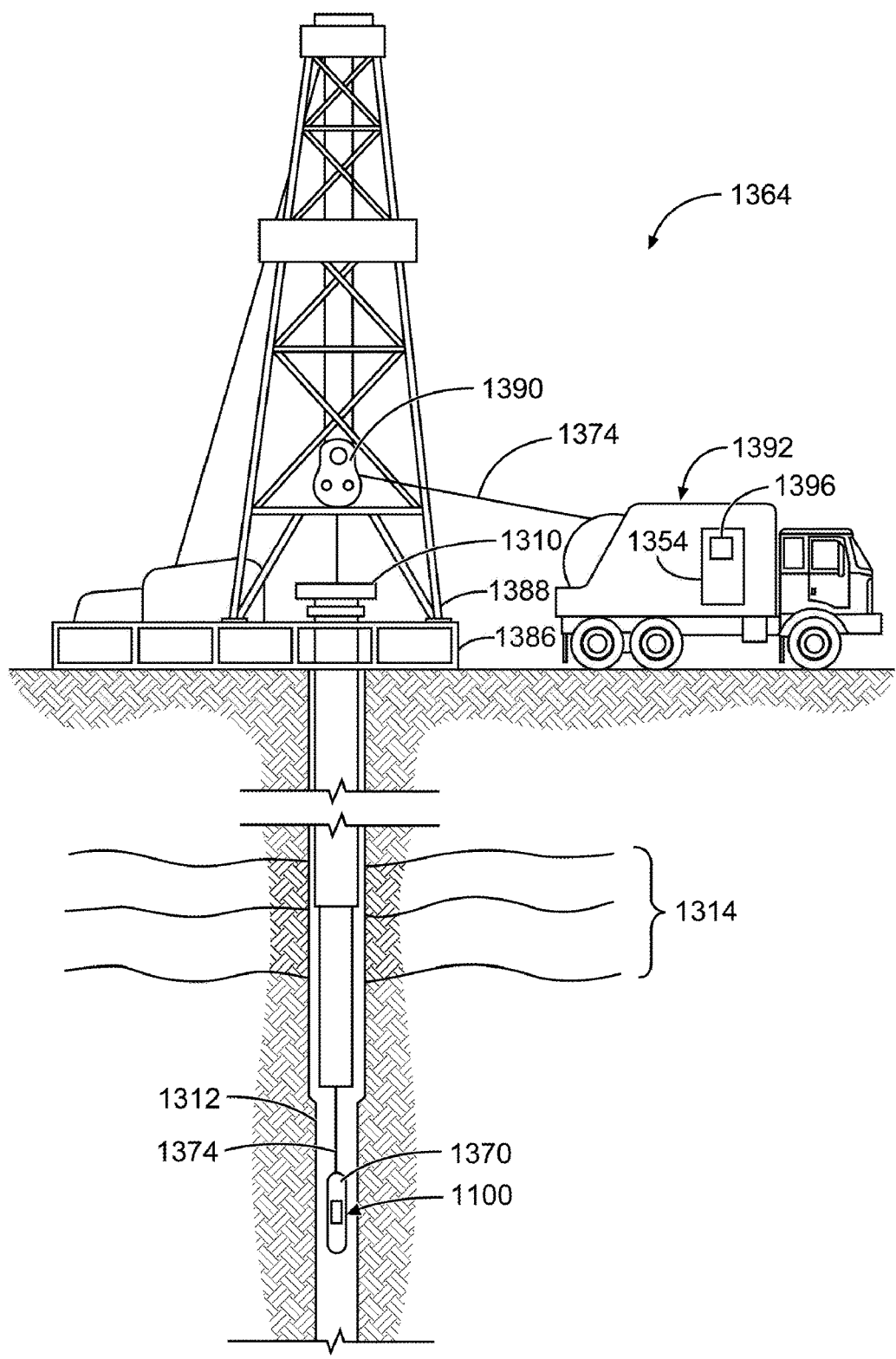
FIG. 13 depicts an example wireline system, according to various embodiments.
Figure 14:
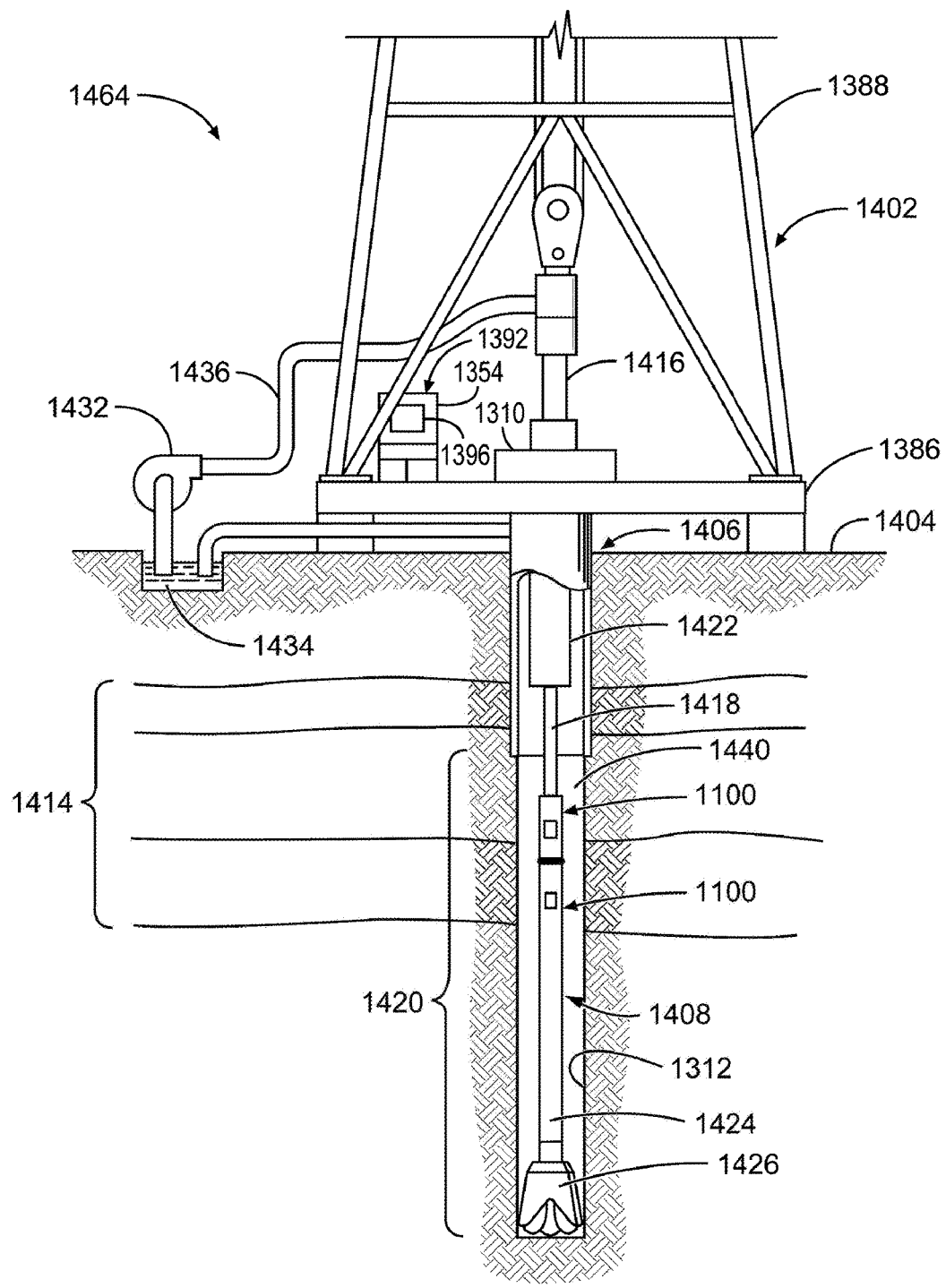
FIG. 14 depicts an example drilling rig system, according to various embodiments.

For example, FIG. 13 depicts an example wireline system 1364, according to various embodiments. FIG. 14 depicts an example drilling rig system 1464, according to various embodiments. Either of the systems in FIG. 13 and FIG. 14 are operable to control a system 1100, or any combination of its components (see FIG. 11), perhaps mounted to a wireline logging body 1370, or a downhole tool 1424; to conduct measurement operations in a well, to determine strain conditions, and to control devices as part of hydrocarbon exploration and recovery operations. Thus, the systems 1364, 1464 may comprise portions of a wireline logging tool body 1370 as part of a wireline logging operation, or of a downhole tool 1424 (e.g., a drilling operations tool) as part of a downhole drilling operation.

Returning now to FIG. 13, a well during wireline logging operations can be seen. In this case, a drilling platform 1386 is equipped with a derrick 1388 that supports a hoist 1390.

Drilling oil and gas wells is commonly carried out using a string of drill pipes connected together so as to form a drilling string that is lowered through a rotary table 1310 into a well, also called a borehole 1312. Here it is assumed that the drilling string has been temporarily removed from the borehole 1312 to allow a wireline logging tool body 1370, such as a probe or sonde, to be lowered by wireline or logging cable 1374 into the borehole 1312. Typically, the wireline logging tool body 1370 is lowered to the bottom of the region of interest and subsequently pulled upward at a substantially constant speed.

During the upward trip, at a series of depths the instruments (e.g., the measurement device 1104 shown in FIG. 11) included in the tool body 1370 may be used to perform measurements on the subsurface geological formations adjacent the borehole 1312 (and the tool body 1370). The measurement data can be communicated to a surface logging facility 1392 for storage, processing, and analysis. The logging facility 1392 may be provided with electronic equipment for various types of signal processing, which may be implemented by any one or more of the components of the system 11 shown in FIG. 11. Similar formation evaluation data may be gathered and analyzed during drilling operations (e.g., during LWD operations, and by extension, sampling while drilling).

In some embodiments, the tool body 1370 comprises one or more systems 1100 for obtaining and communicating measurements in a subterranean formation through a borehole 1312. The tool is suspended in the well by a wireline cable 1374 that connects the tool to a surface control unit (e.g., comprising a workstation 1354, which can also include a display). The tool may be deployed in the borehole 1312 on coiled tubing, jointed drill pipe, hard wired drill pipe, or any other suitable deployment technique.

Turning now to FIG. 14, it can be seen how a system 1464 may also form a portion of a drilling rig 1402 located at the surface 1404 of a well 1406. The drilling rig 1402 may provide support for a drill string 1408. The drill string 1408 may operate to penetrate the rotary table 1310 for drilling the borehole 1312 through the subsurface formations 1314. The drill string 1408 may include a Kelly 1416, drill pipe 1418, and a bottom hole assembly 1420, perhaps located at the lower portion of the drill pipe 1418.

The bottom hole assembly 1420 may include drill collars 1422, a downhole tool 1424, and a drill bit 1426. The drill bit 1426 may operate to create the borehole 1312 by penetrating the surface 1404 and the subsurface formations 1414. The downhole tool 1424 may comprise any of a number of different types of tools including MWD tools, LWD tools, and others.

During drilling operations, the drill string 1408 (perhaps including the Kelly 1416, the drill pipe 1418, and the bottom hole assembly 1420) may be rotated by the rotary table 1310. Although not shown, in addition to, or alternatively, the bottom hole assembly 1420 may also be rotated by a motor (e.g., a mud motor) that is located downhole. The drill collars 1422 may be used to add weight to the drill bit 1426. The drill collars 1422 may also operate to stiffen the bottom hole assembly 1420, allowing the bottom hole assembly 1420 to transfer the added weight to the drill bit 1426, and in turn, to assist the drill bit 1426 in penetrating the surface 1404 and subsurface formations 1314.

During drilling operations, a mud pump 1432 may pump drilling fluid (sometimes known by those of ordinary skill in the art as "drilling mud") from a mud pit 1434 through a hose 1436 into the drill pipe 1418 and down to the drill bit 1426. The drilling fluid can flow out from the drill bit 1426 and be returned to the surface 1404 through an annular area 1440 between the drill pipe 1418 and the sides of the borehole 1312. The drilling fluid may then be returned to the mud pit 1434, where such fluid is filtered. In some embodiments, the drilling fluid can be used to cool the drill bit 1426, as well as to provide lubrication for the drill bit 1426 during drilling operations. Additionally, the drilling fluid may be used to remove subsurface formation cuttings created by operating the drill bit 1426.

Thus, it may be seen that in some embodiments, the systems 1364, 1464 may include a drill collar 1422, a downhole tool 1424, and/or a wireline logging tool body 1370 to house one or more systems 1100, or components of the system 1100, similar to or identical to those that have been described above.

Thus, for the purposes of this document, the term "housing" may include any one or more of a drill collar 1422, a downhole tool 1424, or a wireline logging tool body 1370 (all having an outer wall, to enclose or attach to magnetometers, sensors, fluid sampling devices, pressure measurement devices, transmitters, receivers, fiber optic cable, acquisition and processing logic, and data acquisition systems). The tool 1424 may comprise a downhole tool, such as an LWD tool or MWD tool. The wireline tool body 1370 may comprise a wireline logging tool, including a probe or sonde, for example, coupled to a logging cable 1374. Many embodiments may thus be realized.

Any of the above components, including those of the systems 1100, 1364, 1464 may all be characterized as "modules" herein. Such modules may include hardware circuitry, and/or a processor and/or memory circuits, software program modules and objects, and/or firmware, and combinations thereof, as desired by the architect of the apparatus and systems described herein, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, a measured radiation simulation package, a strain simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus and systems are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Thus, many other embodiments may be realized.

For example, referring now to FIGS. 1-14, it can be seen that in some embodiments, a system 1100 may comprise a sensor ELE1 to make draw-down pressure measurements in a perforated portion of a well, and a processing unit 1102 to process the measurements and determine the resulting strain, and its relation to sanding. In some embodiments, a system 1100 comprises at least one sensor ELE1, ELE2, . . . ELEn configured to provide draw-down pressure measurements in a perforated portion of a well; and a processing unit 1102 coupled to the at least one sensor ELE1, ELE2, . . . ELEn to receive the draw-down pressure measurements, the processing unit 1102 to determine strain in the perforated portion by applying the draw-down pressure measurements to a surface of at least one perforation tunnel in the perforated portion, wherein the perforated portion has been modeled using stress components provided by a global field model of the geological formation that includes a location of the well to set boundary conditions at a surface of the well, and wherein a well drilling process and a tunnel perforating process have been modeled with element removal and pressure addition for the perforated portion.

The system 1100 may include a pump. Thus, in some embodiments, the system 1100 comprises a controlled device 1170, perhaps in the form of a pump that is controlled to operate in response to the strain determined by the processing unit 1102, to control a rate of hydrocarbon extraction from the geological formation.

The system may include an alarm. Thus, in some embodiments, a system 1100 comprises an alarm, perhaps operating as a controlled device 1170, to indicate values of the strain above a selected threshold.

A monitor may operate to keep track of the risk of sanding, and perhaps, to indicate transitions between ranges of strain values in traffic-light fashion. Thus, some embodiments of the system 1100 comprise a monitor MONITOR to indicate transitions between selected ranges of the strain (e.g., between a green, yellow, and red condition described with respect to a traffic light display earlier in this document.

In summary, using the apparatus, systems, and methods disclosed herein may provide a global model at field scale, and a sub-model to calculate geo-stress in the neighborhood of a well. In this way, local stress related to the geostructure, such as a syncline or anticline can be taken into account, to improve the accuracy of the geo-stress solutions.

Various embodiments also operate to apply sequential simulation of the drilling process and perforation process, with boundary conditions applied to the surfaces created by these processes. In this way, the dual stress-concentration phenomena around perforation tunnels can be captured. These stress fields are used as a basis for calculation of the CVPDD so that more accurate stress fields solutions can be obtained.

The sub-model used in some embodiments may operate to simulate the stress applied to one or two perforation tunnels. This simplification greatly improves the operational efficiency of the computer making the calculations. Finally, this solution to the technical problem of accurately determining the CVPDD for a particular well is useful for designing completion forms in wells surrounded by weak sand formations, since the level of sanding risk often determines the choice of sand protection devices. Production can also be enhanced, since an optimized value of the draw-down pressure can increase production, and perhaps reduce damage to the production string system caused by sanding. These advantages can significantly enhance the value of the services provided by an operation/exploration company, helping to reduce time-related costs, and providing greater return on investment. Many other embodiments may be realized. Some of these will now be listed as non-limiting examples.

In some embodiments, a method comprises determining one or more strain values in a perforated portion of a well by applying a set of draw-down pressures to the surface of at least one perforation tunnel in the perforated portion. The perforated portion is modeled using stress components provided by a global field model that includes a location of the well to set boundary conditions at a surface of the well. The well drilling process and the tunnel perforating process are been modeled with element removal and pressure addition for the perforated portion.

In some embodiments, the displacement constraints derived from the global model are not applied to the surface of the well and the surface of the perforation tunnel. In some embodiments, the stress components include a range of horizontal stress and vertical stress.

In some embodiments, the method includes operating a controlled device based on the value of strain. In some embodiments, the strain comprises an equivalent plastic strain.

In some embodiments, operating the controlled device further comprises controlling a pump to adjust the value of strain. In some embodiments, operating the controlled device comprises publishing the value of strain in a human-readable form.

In some embodiments, the method includes modeling the global field with the global field model, and calculating a geo-stress distribution within the global field to generate the stress components.

In some embodiments, the method includes simulating, with a sub-model, the well drilling process by removing formation elements that occupy the well location; and simulating, with the sub-model, the tunnel perforating process by removing formation elements that occupy a location of the at least one perforation tunnel.

In some embodiments, the method includes simulating pressure addition to the well using mud weight applied to the well surface; and then simulating pressure addition to the at least one perforation tunnel using hydrocarbon fluid pressure applied to a tunnel surface. In some embodiments, simulating the pressure addition to the at least one perforation tunnel further comprises using pore pressure to set a boundary condition at the tunnel surface.

In some embodiments, applying the set of draw-down pressures to the surface of the at least one perforation tunnel further comprises calculating transient consolidation of fluid pressure and pore pressure distribution within a sub-model associated with the global field model.

In some embodiments, operating the controlled device further comprises comparing the strain as an equivalent plastic strain generated by the draw-down pressures to an equivalent plastic strain associated with a pressure draw-down sufficient to induce sanding.

In some embodiments, operating the controlled device further comprises triggering an audio or visual alarm to indicate the equivalent plastic strain generated by the draw-down pressures is greater than a threshold value related to the equivalent plastic strain associated with a pressure draw-down sufficient to induce sanding.

In some embodiments, the equivalent plastic strain associated with a pressure draw-down sufficient to induce sanding is determined by one of data associated with actual sanding that occurs in the field, core test results specific to sanding, or an assumed value based on experience in other locations.

In some embodiments, determining the strain further comprises performing porous elasto-plastic calculations using material parameters associated with the global field model, strength parameters of a reservoir formation within the global field model, and pore pressure within the perforated section of the well.

In some embodiments, determining the strain further comprises determining an incremental plastic strain equal to a total plastic strain minus plastic strain generated when the perforation tunnel is formed.

In some embodiments, a system comprises at least one sensor configured to provide draw-down pressure measurements in a perforated portion of a well; and a processing unit coupled to the at least one sensor to receive the draw-down pressure measurements, the processing unit to determine strain in the perforated portion by applying the draw-down pressure measurements to a surface of at least one perforation tunnel in the perforated portion, wherein the perforated portion has been modeled using stress components provided by a global field model of the geological formation that includes a location of the well to set boundary conditions at a surface of the well, and wherein a well drilling process and a tunnel perforating process have been modeled with element removal and pressure addition for the perforated portion.

In some embodiments, a system comprises one or more pumps controlled to operate in response to the strain determined by the processing unit, to control a rate of hydrocarbon extraction from the geological formation.

In some embodiments, a system comprises one or more alarms to indicate values of the strain above a selected threshold. Thus, in some embodiments, a system comprises one or more monitors to indicate transitions between selected ranges of the strain.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Although specific embodiments have been illustrated and described herein, it will be appreciated by those of ordinary skill in the art that any arrangement that is calculated to achieve the same purpose may be substituted for the specific embodiments shown. Various embodiments use permutations or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A method, comprising:
    building a global model of a field including an actual wellbore extending through geological formations, the global model accounting for the details of the geological formations included in the field around the wellbore;
    determining, from the global model, stress components in the field;

building a sub-model accounting for a portion of the field at the location of the wellbore using a finite element modeling tool, the sub-model including a plurality of formation elements;

applying the stress components to the sub-model as boundary conditions;

modeling the wellbore by removing formation elements from the sub-model to define a well surface in the sub-model;

modeling a perforated portion of the wellbore by removing formation elements from the sub-model to define at least one perforation tunnel surface in the sub-model, the perforation tunnel surface intersecting the well surface in the sub-model and extending laterally from the well surface in the sub-model;

determining pressure values for a set of draw-down pressures of a fluid present downhole in the perforated portion of the wellbore;

determining a value of strain in the perforated portion of the wellbore by applying the pressure values determined for the set of draw-down pressures to the perforation tunnel surface in the perforated portion in the sub-model; and operating a controlled device that is fluidly coupled to the wellbore to control a rate of hydrocarbon extraction from the wellbore, when the value of strain determined is greater than a selected threshold, wherein operating the controlled device adjusts the set of draw-down pressures of the fluid present downhole in the perforated portion of the wellbore.

2. The method according to claim 1, wherein operating the controlled device further comprises:
controlling a pump to adjust the set of draw-down pressures in the perforated portion of the wellbore.

3. The method according to claim 1, wherein operating the controlled device comprises:
publishing the value of strain in a human-readable form.

4. The method according to claim 1, further comprising:
calculating a geo-stress distribution within the field to generate the stress components.

5. The method according to claim 1, further comprising:
simulating pressure addition to the wellbore using mud weight applied to the well surface in the sub-model; and
simulating pressure addition to the perforated portion of the wellbore using hydrocarbon fluid pressure applied to the perforation tunnel surface in the sub-model.

6. The method according to claim 5, wherein simulating the pressure addition to the perforated portion of the wellbore further comprises:
using pore pressure to set a boundary condition at the tunnel surface.

7. The method according to claim 1, wherein applying the set of draw-down pressures to the surface of the at least one perforation tunnel further comprises:
calculating, with a hydro-mechanical finite element tool, transient consolidation of fluid pressure and pore pressure distribution within the sub-model associated with the global field model.

8. The method according to claim 1, wherein the value of strain determined comprises an equivalent plastic strain.

9. The method according to claim 8, wherein operating the controlled device further comprises:
comparing the value of strain determined to a threshold value related to an equivalent plastic strain associated with a pressure draw-down sufficient to induce sanding.

10. The method according to claim 9, wherein operating the controlled device further comprises:
triggering an audio or visual alarm to indicate the value of strain determined is greater than a threshold value related to the equivalent plastic strain associated with a pressure draw-down sufficient to induce sanding.

11. The method according to claim 9, wherein the equivalent plastic strain associated with a pressure draw-down sufficient to induce sanding is determined by at least one of data associated with actual sanding that occurs in the field, core test results specific to sanding, and an assumed value based on experience in other locations.

12. The method according to claim 1, wherein determining the value of strain further comprises:
performing porous elasto-plastic calculations using material parameters associated with the global field model, strength parameters of a reservoir formation within the global field model, and pore pressure within the perforated section of the well.

13. The method according to claim 1, wherein displacement constraints derived from the global model are not applied to the surface of the well and the surface of the perforation tunnel.

14. The method according to claim 1, wherein the stress components include a range of horizontal stress and vertical stress.

15. The method according to claim 1, wherein determining the strain further comprises:
determining an incremental plastic strain, wherein the incremental plastic strain is equal to a total plastic strain minus an amount of plastic strain that is generated when the perforation tunnel is formed.

16. The method according to claim 1, wherein determining the set of draw-down pressures in the perforated portion of the wellbore includes measuring draw-down pressure information with a measurement disposed downhole in the wellbore.

17. A system, comprising:
at least one sensor configured to provide draw-down pressure measurements of a pressure of a fluid present in a perforated portion of a well; and
a processing unit coupled to the at least one sensor to receive the draw-down pressure measurements;
a storage device having instructions stored thereon that when executed by the processing unit cause the processing unit to determine a value of strain in the perforated portion by applying the draw-down pressure measurements to a surface of at least one perforation tunnel in a model of the perforated portion, wherein the model uses stress components provided by a global field model of a geological formation that includes the well to set boundary conditions at a surface of the well, and wherein the model has been built by simulating a well drilling process to define a well surface in the model and a tunnel perforating process to define a perforation tunnel surface intersecting the well surface in the model by removing formation elements from the model at the location of the well and perforation tunnels, and by simulating pressure addition for the perforated portion by applying the draw-down pressure measurement to at least one perforation tunnel surface defined by removal of the formation elements from the model at the location of the perforation tunnels intersecting the well surface in the model; and
a controlled device operably coupled to the processing unit and fluidly coupled to the wellbore, the controlled device operable to adjust the pressure of the fluid present in the well when the processing unit determines a value of strain that is greater than a selected threshold.

18. The system according to claim 17, further comprising:
a pump controlled to operate in response to the value of strain determined by the processing unit, to control a rate of hydrocarbon extraction from the geological formation.

19. The system according to claim 17, further comprising an alarm to indicate values of the strain above the selected threshold.

20. The system according to claim 17, further comprising:
a monitor to indicate transitions between selected ranges of the value of strain determined by the processing unit.

\* \* \* \* \*

UNITED STATES PATENT AND TRADEMARK OFFICE
CERTIFICATE OF CORRECTION

PATENT NO. : 10,428,641 B2
APPLICATION NO. : 15/026815
DATED : October 1, 2019
INVENTOR(S) : Xinpu Shen, Guoyang Shen and William Standifird It is certified that error appears in the above-identified patent and that said Letters Patent is hereby corrected as shown below:

In the Specification

Column 2, Line 30 change "arid" to -- and --

Column 10, Line 41 change "HE" to -- ELE1 --

Signed and Sealed this
Eighteenth Day of February, 2020

Andrei Iancu
*Director of the United States Patent and Trademark Office*